United States Patent [19]

Yaguchi

[11] Patent Number: 4,631,596
[45] Date of Patent: Dec. 23, 1986

[54] IMAGE COMMUNICATIONS APPARATUS FOR LONG-SIZE COPY IMAGE

[75] Inventor: Tatsuya Yaguchi, Yokohama, Japan

[73] Assignee: Canon Kabushiki Kaisha, Tokyo, Japan

[21] Appl. No.: 703,673

[22] Filed: Feb. 20, 1985

[30] Foreign Application Priority Data

Feb. 24, 1984 [JP] Japan .................................. 59-32602

[51] Int. Cl.4 ........................ H04N 1/18; H04N 1/387
[52] U.S. Cl. .................................... 358/256; 358/257; 358/280; 358/288
[58] Field of Search ............... 358/256, 257, 280, 284, 358/288, 293; 355/40

[56] References Cited

U.S. PATENT DOCUMENTS 4,310,859  1/1982  Takahashi ........................... 358/256
4,439,790  3/1984  Yoshida ............................... 358/256
4,445,195  4/1984  Yamamoto .......................... 358/256

Primary Examiner—Michael A. Masinick
Attorney, Agent, or Firm—Fitzpatrick, Cella Harper & Scinto

[57] ABSTRACT

An image communications apparatus divides a long-size original image into a standard-size image portion and a remaining image portion in a transmission mode, and in recording a received long-size original image divides it into a standard-size image portion and a remaining image portion in a reception mode. When the apparatus divides the long-size original image into a standard-size image, a portion of the original image at which division is performed is set to be a blank portion by controlling information of the original image so that partial split image in a printed paper can be prevented.

11 Claims, 9 Drawing Figures

IMAGE COMMUNICATIONS APPARATUS FOR LONG-SIZE COPY IMAGE

BACKGROUND OF THE INVENTION

1. Field of the Invention

The present invention relates to an image communications apparatus which transmits/receives data of a copy image (or an original image), and more particularly to an image communications apparatus which can divide a long-size copy image into portions and transmit/receive the data for the several portions.

2. Description of the Prior Art

A prior art facsimile apparatus is known in which a transmitter divides a long-size copy image and transmits the data of the divided image. In this case, however, since division of the long-size copy image on the transmission side occurs at lengths of a standard-size copy document regardless of the arrangement of the data, the data of the image in the vicinity of the division line may be lost on the reception side, thereby rendering reliable transmission of the data difficult.

SUMMARY OF THE INVENTION

The present invention is intended to eliminate the above drawback.

It is an object of the present invention to provide an image communications apparatus which, on the transmission side, divides a long-size copy (original) image at a blank portion thereof coincident with an end margin of a standard-size copy into a standard-size copy and a second portion (hereinafter termed "the remaining portion,") and transmits the data of the divided images in such a manner that the resulting division line is contained in an end blank portion of a standard-size recording paper on the reception side.

It is another object of the present invention to provide an image communications apparatus which, when the length of an image corresponding to the received data exceeds the length of a standard-size recording paper, records the divided image corresponding to the portion in excess of the standard length on another recording paper in such a manner that the resulting division line is contained in an end blank portion of the standard-size recording paper.

The above and other objects, features and advantages of the present invention will be apparent from the following description of preferred embodiments thereof, taken in conjunction with the accompanying drawings.

DETAILED DESCRIPTION OF THE PREFERRED EMBODIMENTS

The present invention will be described in detail with reference to the accompanying drawings.

Figure 1:
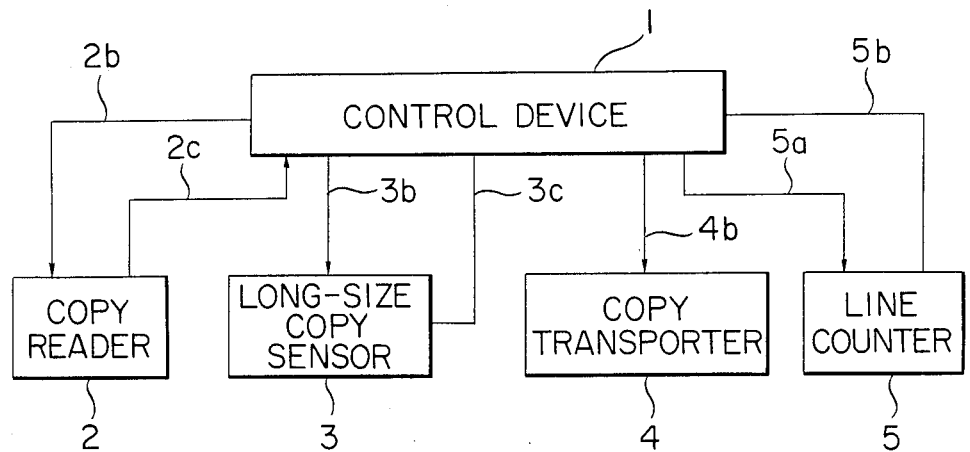
FIG. 1 is a block diagram illustrating the whole structure of a facsimile apparatus which is a first embodiment of the present invention.

Referring to FIG. 1, there is shown in a block diagram of a facsimile apparatus which is a first embodiment of the present invention. Reference numeral 1 denotes a control device which controls the whole facsimile apparatus. Connected to the control device 1 is a copy (original) reader 2 which includes a well-known CCD or the like. The reader 2 scans and reads a copy (original) in the main scanning direction and then in the subscanning direction. The reader 2 is controlled by the control device 1 via a signal line 2b, and inputs the read image signal to the control device 1 via a signal line 2c. Also connected to control device 1 is a long-size copy (original) sensor 3 which is controlled via a signal line 3b by the control device 1 which detects whether or not a copy (original) to be read is a long-size one and which inputs the resulting signal via a signal line 3c to the control device 1.

A copy transporter 4, which transports the copy, is connected to the control device 1 and is started and stopped via a signal line 4b by the control device 1. A line counter 5 is driven via a signal line 5a by the control device 1. It is incremented by one as the number of lines scanning an image of the copy increases by one. The number of scanned lines accumulated in the counter 5 is input via a signal line 5b to the control device 1.

Figure 2:
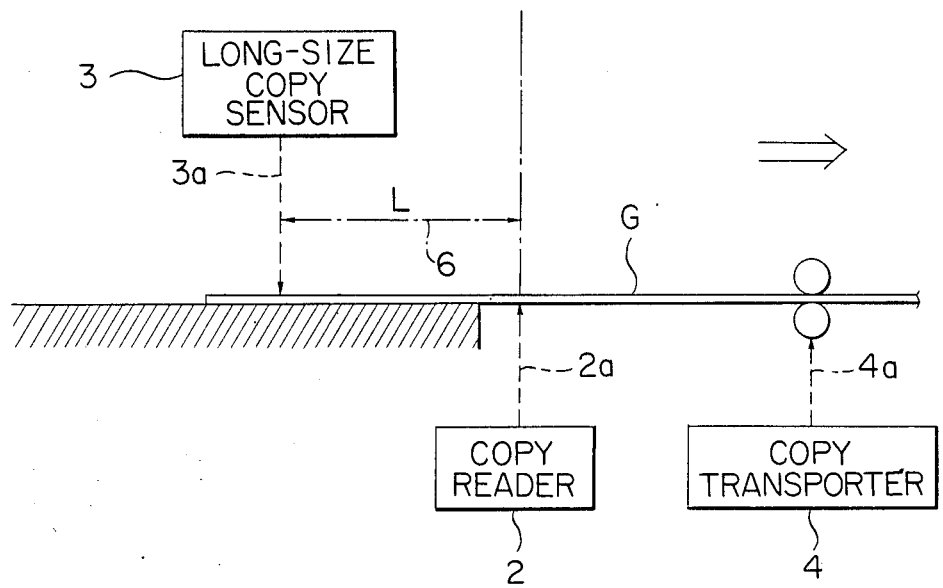
FIG. 2 illustrates the positional relationship between a long-size copy sensor and a reader.

In FIG. 2, the arrangement of the reader 2, the long-size copy sensor 3 and the transporter 4 is illustrated in detail. When a copy (original) G has a length greater than a distance L between points 2a and 3a respectively projected on the copy from the reader 2 and sensor 3, the sensor 3 determines that the set copy is a long-size copy and inputs it to the control device 1 via the signal line 3c.

Figure 3:
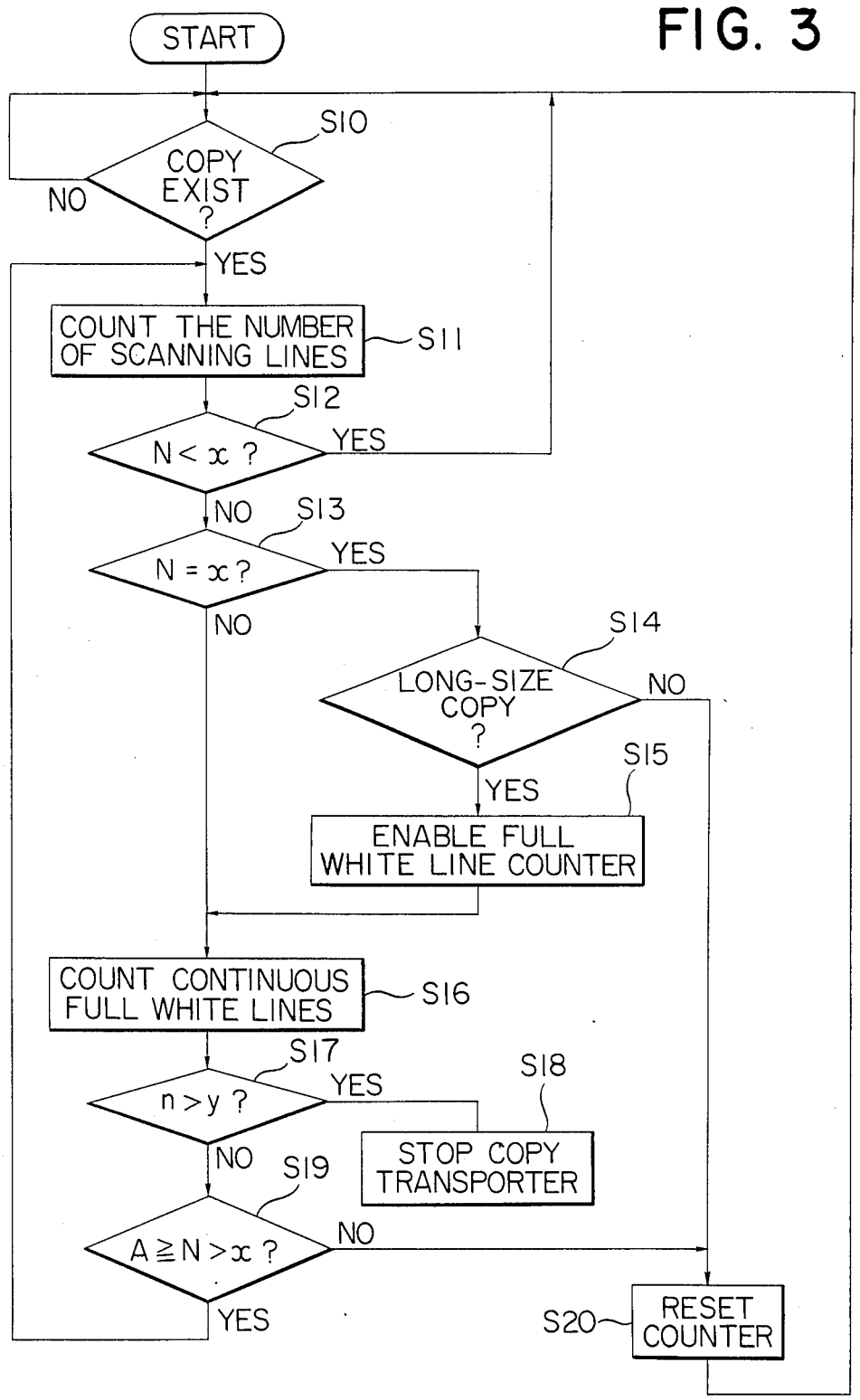
FIG. 3 is a flowchart of a control process.

The flow of control by the control device 1 will now be described with reference to the flowchart of FIG. 3.

At first, at a step S10, the presence of a copy (original) is checked: i.e., the control device 1 instructs the reader 2 via the signal line 2b to detect the presence or absence of a copy via the signal line 2c. When the copy is determined to be present, reading of the copy starts by a scanning operation at a step S11, and the number of scanning lines is counted. This is performed because the control device 1 instructs the line counter 5 via the control line 5a for incrementing operation. The control device 1 can refer via the signal line 5b to the value of the counter 5, i.e., the accumulated number of lines, if required. Then, at a step S12, the control device 1 determines whether or not the accumulated number of lines scanned is smaller than a reference value x. If the accumulated number of lines scanned is determined to be less than x, control returns to the step S11 where the counter 5 continues to count the number of scanning lines. If the accumulated number of scanned lines is not less than x, then control passes to a step S13. The reference x is determined as follows: assume that recording is performed at a line density of 7.7 lines/mm and that the distance L is 2 cm. Then the total of lines scanned over the overall face of an A4 standard-size copy is $297 \times 7.7 = 2,287$. Therefore, the value of x is $2,287 - 7.7 \times 20 = 2,133$. Thus, when the accumulated number of scanning lines equals the reference value x, it means that in the case of a standard-size copy, scanning over the portion of the document which contains substantially all the image data has been completed and has reached an end blank portion of the copy.

At the step S13, it is determined whether or not the accumulated number of lines N equals the reference value x. If it equals the value x, control passes to a step S14 where it is determined whether or not the transmitted copy is a long-size one. This is performed because the control device 1 instructs the long-size copy sensor 3 via control line 3b to sense the level of the signal line 3c. If it is not a long-size one, control passes to a step S20 where the line counter 5 is reset. Then, control returns to step S10. If it is a long-size one, a full-white line counter is enabled at a step S15. Then, control passes to a step S16, where the full-white line counter is caused to count serial full-white lines under the conditions of $N \geq x$.

At a step S17, it is determined whether or not the number of full white lines, n, has exceeded the reference value y. If it is determined to have exceeded y, control passes to a step S18 where the movement of the document stops, thereby rendering white all the remaining data of the copy. This means that the long-size copy is divided at an end blank portion thereof into a standard-size copy portion and the remaining portion and the data contained in the standard-size copy portion is transmitted. On the other hand, when n has not exceeded the reference value y, control passes to a step S19. The reference value y can be an arbitrary value, but in the particular embodiment, y=77 lines (7.7 lines/mm × 10 mm) is employed. At step 19, it is determined whether or not the accumulated number of scanning lines, N, satisfies the relationship $A \geq N > x$ where A is the total number of scanning lines of the copy. If the relationship is satisfied, control returns to step S11. Otherwise, control passes to a step S20 where the line counter is reset and control returns to the initial step when the copy is not a long-size one at step S14 or when the relation $A \geq N > x$ is not satisfied at step S19.

Figure 4C:
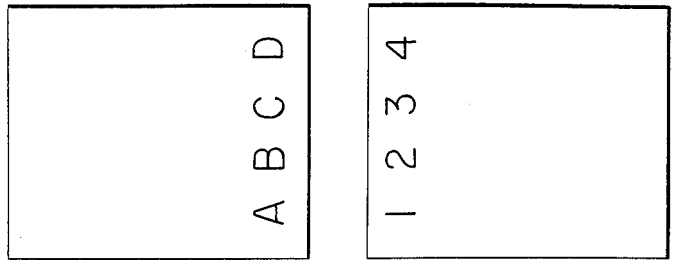
FIG. 4C illustrates an example of division recording according to the present invention.
Figure 4B:
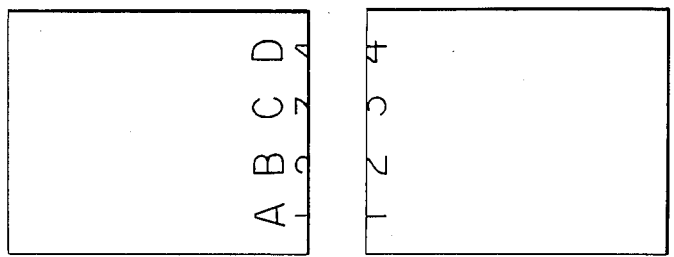
FIG. 4B illustrates an example of division recording according to prior art techniques.
Figure 4A:
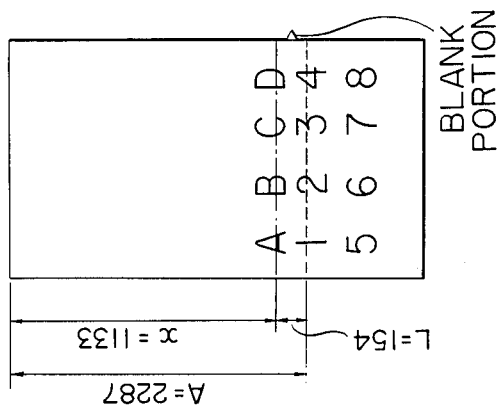
FIG. 4A illustrates an example of a long-size copy (original)

When the data of an image contained in a long-size copy such as shown in FIG. 4A is transmitted, the figures "1", "2", "3" and "4" in the copy may be arranged on a broken division line according to the prior art techniques. Thus, the figures will be reproduced separated, as shown in FIG. 4B, on the reception side. However, according to the present invention, a blank within an end section L (FIG. 4A) of a standard-size portion of the copy is sensed and division is performed in the blank, and the information contained in the divided standard-size copy portion is transmitted. Consequently, as shown in FIG. 4C, the figures "1", "2", "3" and "4" are not split and are recorded in perfect form on another standard-size paper on the reception side.

Figure 5:
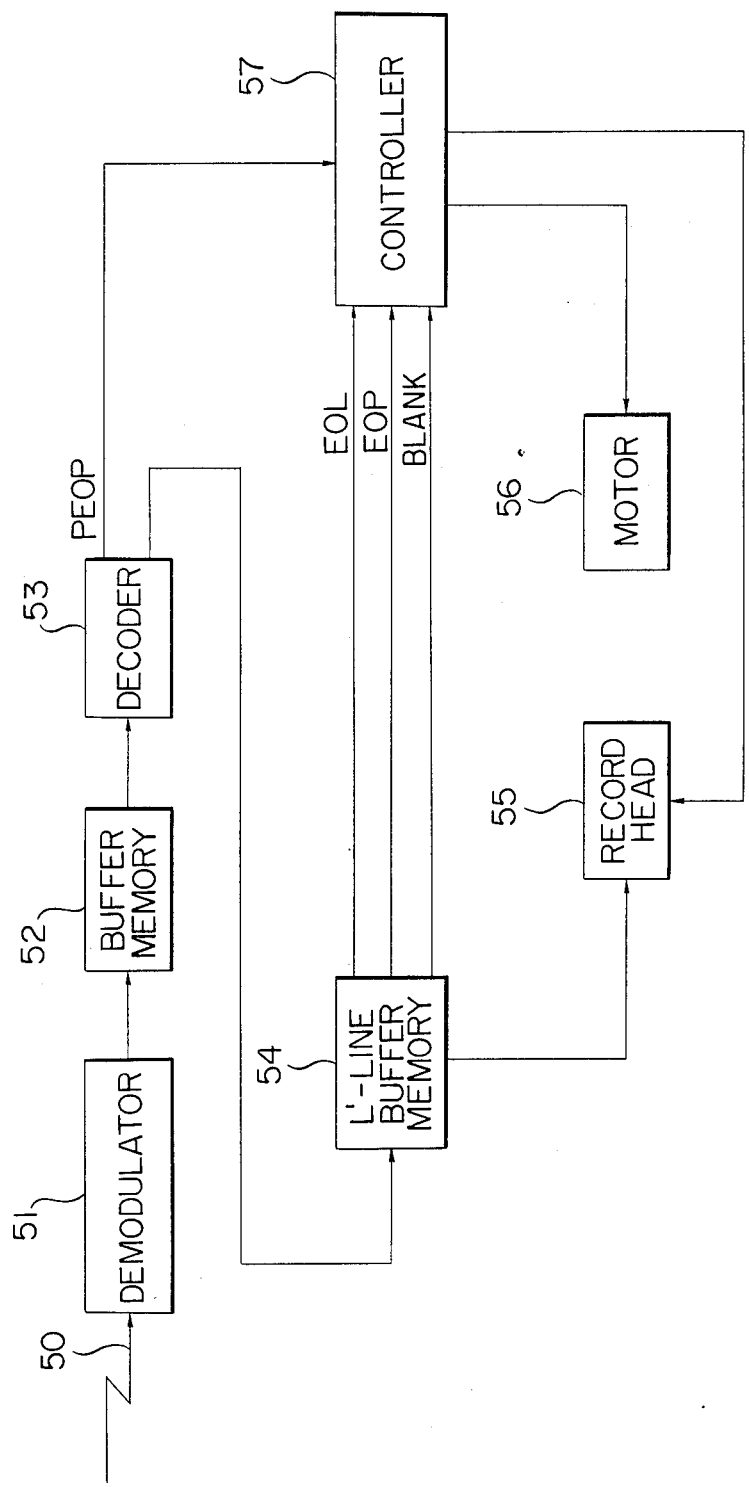
FIG. 5 is a block diagram illustrating the whole structure of a facsimile reception apparatus which is a second embodiment of the present invention.

The above embodiment is directed to detection of a blank portion of a long-size copy on the transmission side. Next, a second embodiment of the present invention will be described which detects and divides a blank portion of the long-size copy on the reception side and records the image data of the divided page. FIG. 5 is a block diagram of a facsimile reception apparatus which is the second embodiment of the present invention. In FIG. 5, reference numeral 50 denotes telephone lines via which a demodulator 51 receives a signal representative of the data of an image contained in a long-size copy. The demodulator 51 demodulates the received signal. A buffer memory 52 temporarily stores the demodulated compressed image signal from the demodulator. A decoder 53 decodes the demodulated compressed image signal from the buffer memory into the image signal. An L' line buffer memory 54 stores the image signal contained in the number of scanned lines L' from the decoder 53. A recording head 55 stores the image data contained in a single scanning line. An electric motor 56 carries recording paper by one line at a time. A control device 57 controls operation of the respective elements, as mentioned above, and is composed of a CPU, a RAM, a ROM, etc. The control device 57 receives a full-white line signal, which represents that a scanning line is fully white, a signal EOL (End Of Line) which represents the end of a line, and a signal EOP (End Of Page) which represents the end of a scanned page, from the buffer memory 54, and also a signal EOP (End Of Page) from the decoder 53. The output of the decoder 53 is a line earlier by L' lines than the current line which the recording head 55 is recording. Thus, the output signal EOP of the decoder 53 is referred to as P(Pre)EOP.

Figure 6A:
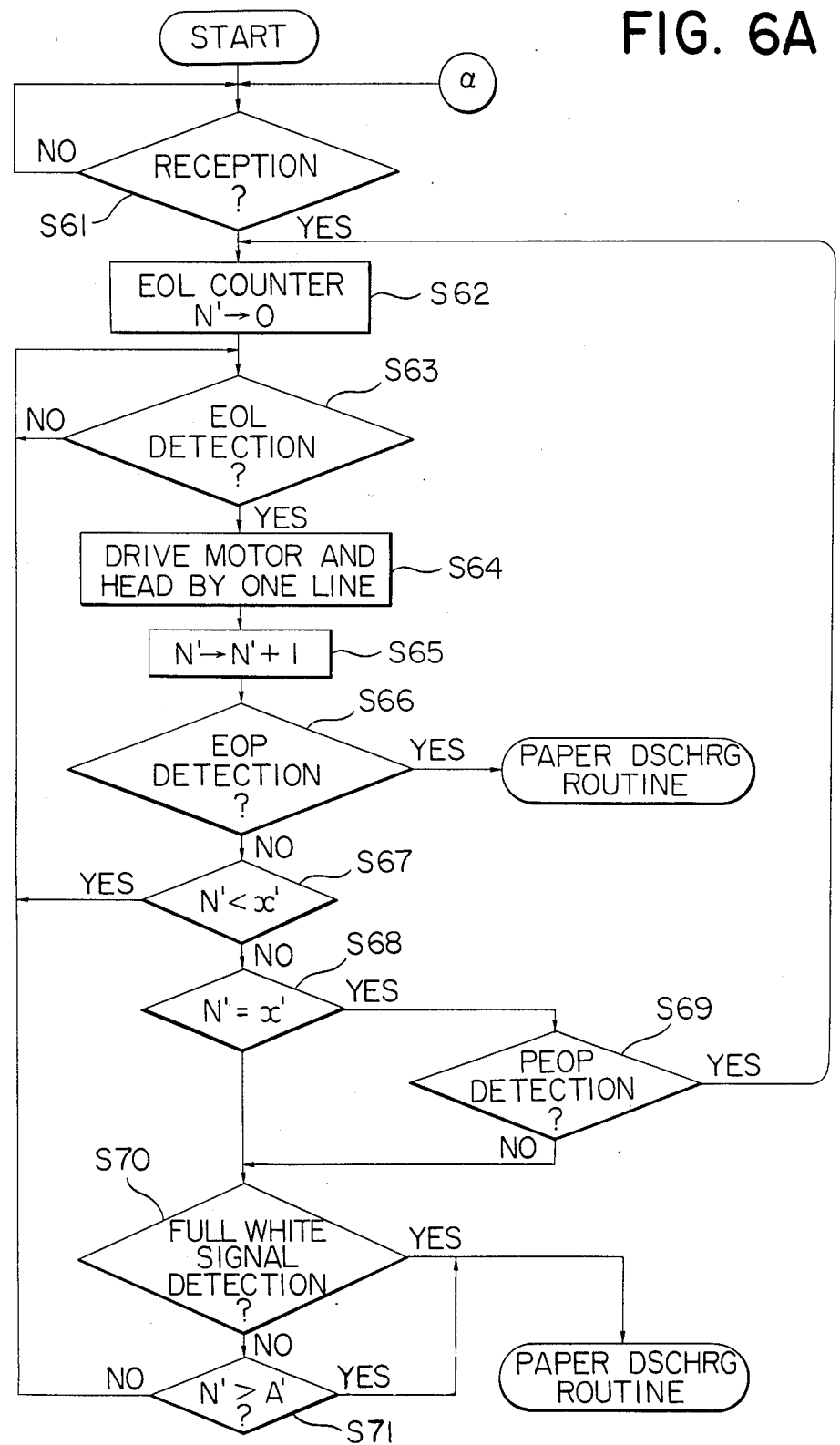
FIGS. 6A and 6B are flowcharts illustrating a control process of the second embodiment.
Figure 6B:
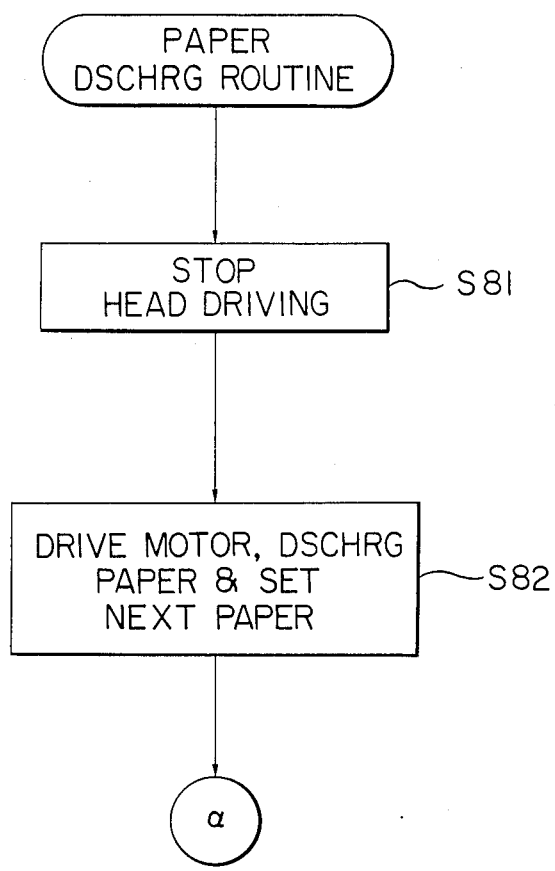

The operation of the facsimile reception apparatus of FIG. 5 will be described with respect to the flowcharts of FIGS. 6A and 6B.

When reception of a signal is detected at a step S61, the contents N' of an EOL counter of the control apparatus 57, which counts EOL signals each representative of the end of a scanning line, is set to zero at a step S62. When an EOL signal is detected at a step S63, the motor 56 moves the recording paper by an amount corresponding to one scanning line and the head 55 records an image data for the line at a step S64. Then, at a step S65, the count value N' of EOL signals is incremented by one. When an EOP signal, which represents the end of a page, is detected at a step S66 before the value of N' reaches x' corresponding to the x in the first embodiment, control passes to a recording paper discharge routine of FIG. 6B. When N' equals x' with no signal EOP being detected at a step S68, it is determined at a step S69 whether or not the PEOP signal which is the output signal of the decoder 53 has already been detected. When the PEOP signal has been detected, i.e., when the PEOP signal is present in L' lines which are not yet recorded, all the image data can be recorded on an A4 sheet of recording paper, so that control returns to the step S62 and resets the EOL count value N' to zero. When the PEOP signal has not been detected, all the image data can not be recorded on an A4 sheet of recording paper, so that detection of a full white signal is performed for detecting a blank at a step S70.

When the full white signal is detected, i.e., when the full white signal for at least one scanning line is present, control passes to the paper output routine. When the EOL count value N' exceeds the A' value representative of the length of A4 with no full white line being detected, control also passes to the paper discharge routine.

Now, the paper discharge routine will be described with respect to FIGS. 6B. First, at a step S81, the driving of the head 55 is stopped and recording of further image signals is stopped. At a step S82, the motor 56 is driven, thereby discharging the recorded paper, and the next new paper is set. Then control returns to step S61. Therefore, when the image data, which is not yet recorded, is remaining, it is recorded on the next paper.

As will be seen from the above, provision of the buffer memory which stores image data for L' lines allows detection of a blank portion for full white lines, etc., on the reception side, so that useful information can be recorded on a standard-size paper without being split.

As described above, according to the present invention, when the image data of a long-size copy (original) is divided either on the transmission side or on the reception side, division occurs in an end blank portion of a standard-size portion of the copy. Thus, failure of data is prevented, thereby ensuring complete recognition of images such as characters, etc.

It is noted that the present invention is not restricted to the above embodiments and that various changes and modifications could be apparent to those skilled in the art without departing from the scope of the present invention set forth in the attached claims.

What is claimed is:

1. An image communications apparatus comprising:
   first sensing means for sensing whether or not the length of an original image is longer than a predetermined length;
   second sensing means for sensing a blank portion of the original; and
   processing means for dividing the original image utilizing said blank portion as a border when the length of the original image is sensed to be longer than the predetermined length.

2. An image communications apparatus according to claim 1, wherein said processing means includes a transmission means which divides the original image utilizing said blank portion as a border and transmits data of the divided original images.

3. An image communications apparatus according to claim 2, further including reading means for reading the original image.

4. An image communications apparatus according to claim 1, wherein said processing means is recording means which divides the original image utilizing said blank portion as a border and records the divided original images.

5. An image communications apparatus according to claim 4, further including demodulator means for demodulating a signal representative of said original image.

6. An image transmitting apparatus comprising:
   reading means for reading an original image;
   transmitting means for transmitting an image signal read out by said reading means;
   sensing means for sensing whether or not the length of said original image is longer than a predetermined length;
   blank portion sensing means for sensing the presence of a blank portion within said predetermined length of said original image; and
   stopping means for temporarily stopping transmission of said transmitting means when the length of said original image is sensed to be longer than the predetermined length.

7. An image transmitting apparatus according to claim 6, wherein said blank portion sensing means senses a blank portion in a limited area within said predetermined length of said original image.

8. An image transmitting apparatus according to claim 6, wherein said stopping means is operable to stop the reading operation of said reading means at said blank portion.

9. An image receiving apparatus comprising:
   receiving means for receiving a signal representative of an original image;
   sensing means for sensing whether or not the length of the image represented by the received image signal is longer than a predetermined length;
   blank portion sensing means for sensing a blank portion within said predetermined length of the received image; and
   recording means for dividing the original image utilizing said blank portion as a border and for respectively recording the divided original images on separate recording members when the length of said received original image is sensed to be longer than the predetermined length.

10. An image receiving apparatus according to claim 9, wherein said blank portion sensing means senses a blank portion in a predetermined area within said predetermined length of the original image.

11. An image receiving apparatus according to claim 9, further including memory means for temporarily storing said received image signal for a predetermined number of scanning lines.

* * * * *